(12) United States Patent
Choraku et al.

(10) Patent No.: US 9,360,639 B2
(45) Date of Patent: Jun. 7, 2016

(54) ELECTRONIC DEVICE AND OPTICAL CONNECTOR

(71) Applicant: FUJITSU LIMITED, Kawasaki-shi, Kanagawa (JP)

(72) Inventors: Kohei Choraku, Yokohama (JP); Tetsuro Yamada, Kawasaki (JP); Takahiro Ooi, Kawasaki (JP); Masahiro Iwama, Kawasaki (JP); Daisuke Usui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 14/179,596

(22) Filed: Feb. 13, 2014

(65) Prior Publication Data
US 2014/0270656 A1    Sep. 18, 2014

(30) Foreign Application Priority Data
Mar. 18, 2013  (JP) .................................. 2013-055240

(51) Int. Cl.
*G02B 6/42* (2006.01)
*G02B 6/43* (2006.01)

(52) U.S. Cl.
CPC .............. *G02B 6/423* (2013.01); *G02B 6/4249* (2013.01); *G02B 6/4231* (2013.01); *G02B 6/43* (2013.01)

(58) Field of Classification Search
CPC .................................. G02B 6/42; G02B 6/423
USPC ......................................................... 385/89
See application file for complete search history.

(56) References Cited

U.S. PATENT DOCUMENTS

| | | | | |
|---|---|---|---|---|
| 5,359,208 A * | 10/1994 | Katsuki | ............... | G02B 6/4226 257/432 |
| 5,600,748 A * | 2/1997 | Kosaka | ............... | G02B 6/3885 385/139 |
| 5,604,830 A * | 2/1997 | Kuder | ................. | G02B 6/1221 385/59 |
| 5,606,161 A * | 2/1997 | Schulz | ................. | G02B 6/4296 250/239 |
| 5,647,042 A * | 7/1997 | Ochiai | ................. | G02B 6/4292 385/56 |
| 5,768,456 A * | 6/1998 | Knapp | ................. | G02B 6/4292 385/49 |
| 5,917,976 A * | 6/1999 | Yamaguchi | .......... | G02B 6/4249 385/88 |
| 6,086,265 A * | 7/2000 | Kuribayashi | ......... | G02B 6/4246 385/89 |

(Continued)

FOREIGN PATENT DOCUMENTS

| | | |
|---|---|---|
| JP | 2009-134262 | 6/2009 |
| JP | 2009-175275 | 8/2009 |
| JP | 2011-17933 | 1/2011 |

*Primary Examiner* — Kaveh C Kianni
(74) *Attorney, Agent, or Firm* — Fujitsu Patent Center

(57) ABSTRACT

An electronic device includes a board including an electronic component, a plurality of optical interface units that include an optical element which input or output light and that are provided on the board, and a plurality of individual positioning units that position a plurality of respective optical waveguides which are separate from each other at least at tip portions on a side of the optical interface units and which are optically aligned with the optical element with respect to the optical interface units independently from each other.

12 Claims, 13 Drawing Sheets

(56) References Cited

U.S. PATENT DOCUMENTS

| | | | | |
|---|---|---|---|---|
| 6,241,399 B1* | 6/2001 | Nobuhara | G02B 6/30 | 385/81 |
| 6,471,419 B1* | 10/2002 | Hall | G02B 6/4226 | 385/15 |
| 6,540,414 B1* | 4/2003 | Brezina | G02B 6/421 | 264/1.1 |
| 6,599,032 B1* | 7/2003 | Kurashima | G02B 6/3885 | 385/24 |
| 6,669,375 B1* | 12/2003 | Bonja | G02B 6/266 | 385/140 |
| 6,684,007 B2* | 1/2004 | Yoshimura | G02B 6/10 | 257/E23.01 |
| 6,741,778 B1* | 5/2004 | Chan | G02B 6/4231 | 385/52 |
| 7,275,876 B2* | 10/2007 | Morita | H04B 10/801 | 385/14 |
| 2002/0085816 A1* | 7/2002 | Nishimura | G02B 6/421 | 385/89 |
| 2003/0002801 A1* | 1/2003 | Vegny | G02B 6/30 | 385/52 |
| 2003/0002824 A1* | 1/2003 | Chan | G02B 6/4201 | 385/92 |
| 2003/0053767 A1* | 3/2003 | Cheng | G02B 6/4206 | 385/89 |
| 2003/0138220 A1* | 7/2003 | Vaganov | G02B 6/4201 | 385/92 |
| 2003/0152330 A1* | 8/2003 | Greene | G02B 6/4249 | 385/52 |
| 2003/0179993 A1* | 9/2003 | Shigenaga | G02B 6/32 | 385/33 |
| 2003/0201462 A1* | 10/2003 | Pommer | G02B 6/4201 | 257/200 |
| 2004/0067015 A1* | 4/2004 | Nakajima | G02B 3/0018 | 385/33 |
| 2004/0114866 A1* | 6/2004 | Hiramatsu | G02B 6/4292 | 385/39 |
| 2004/0120658 A1* | 6/2004 | McFarland | G02B 6/4292 | 385/89 |
| 2004/0247257 A1* | 12/2004 | Beier | G02B 6/421 | 385/89 |
| 2005/0225864 A1* | 10/2005 | Kornrumpf | G02B 3/0075 | 359/619 |
| 2005/0259927 A1* | 11/2005 | Kato | G02B 6/4204 | 385/93 |
| 2006/0098923 A1* | 5/2006 | Fujiwara | G02B 6/4214 | 385/88 |
| 2007/0237449 A1* | 10/2007 | Aoki | G02B 6/4292 | 385/14 |
| 2009/0116793 A1 | 5/2009 | Nishimura et al. | | |
| 2009/0185775 A1 | 7/2009 | Hodono | | |
| 2009/0214158 A1* | 8/2009 | Lee | G02B 6/43 | 385/14 |
| 2009/0323748 A1* | 12/2009 | Nobuhara | G02B 6/4232 | 372/43.01 |
| 2010/0052463 A1* | 3/2010 | Saito | B21D 28/22 | 310/216.001 |
| 2010/0059901 A1* | 3/2010 | Takamatsu | B29C 45/0055 | 264/138 |
| 2010/0195960 A1* | 8/2010 | Schweiker | G02B 6/4212 | 385/88 |
| 2010/0311270 A1* | 12/2010 | Fukuda | H01R 13/641 | 439/490 |
| 2012/0002923 A1* | 1/2012 | Nakano | G02B 6/4231 | 385/38 |
| 2012/0106895 A1* | 5/2012 | Koreeda | G02B 6/4292 | 385/71 |
| 2013/0011100 A1* | 1/2013 | Shiraishi | G02B 6/3861 | 385/77 |
| 2013/0071063 A1* | 3/2013 | Aoki | G02B 6/327 | 385/33 |
| 2013/0084045 A1* | 4/2013 | Aoki | G02B 6/3576 | 385/92 |
| 2014/0161396 A1* | 6/2014 | Feng | G02B 6/4243 | 385/83 |
| 2014/0219603 A1* | 8/2014 | Laughlin | G02B 6/43 | 385/14 |
| 2015/0010273 A1* | 1/2015 | Oyagi | G02B 6/428 | 385/33 |

* cited by examiner

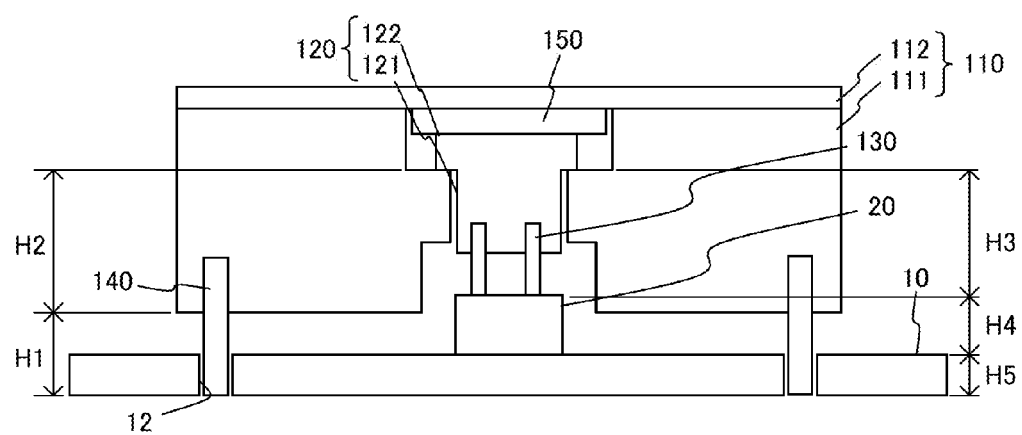
F I G. 7

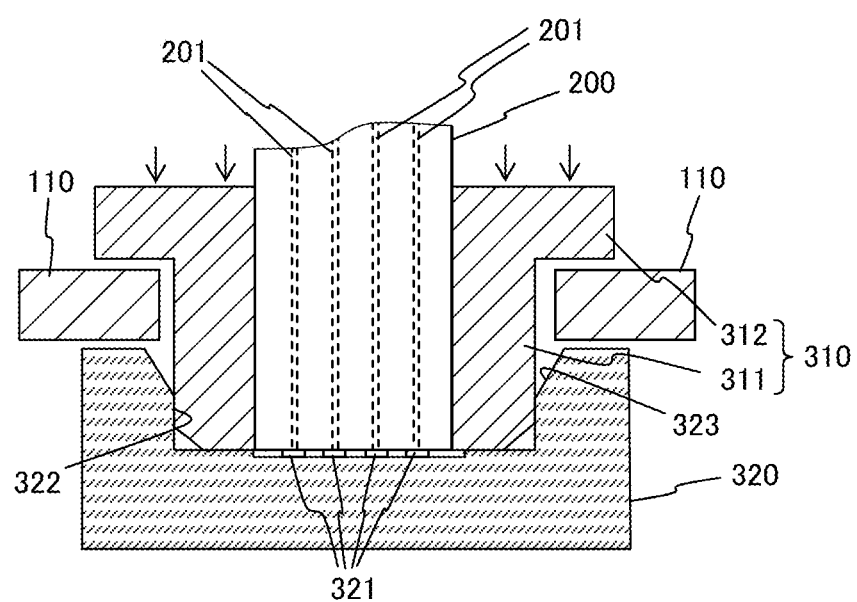
F I G. 8

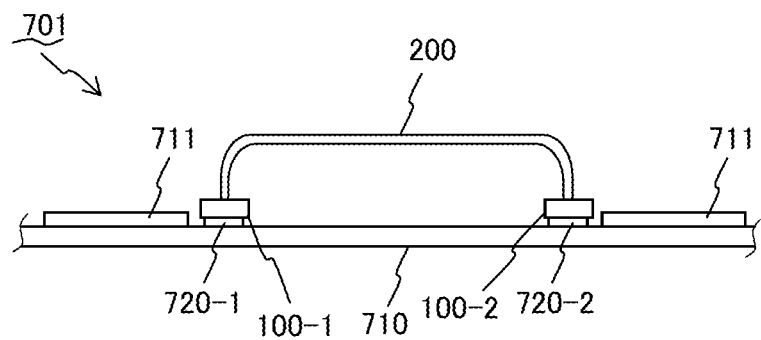
F I G. 13

ELECTRONIC DEVICE AND OPTICAL CONNECTOR

CROSS-REFERENCE TO RELATED APPLICATION

This application is based upon and claims the benefit of priority of the prior Japanese Patent Application No. 2013-055240 filed on Mar. 18, 2013, the entire contents of which are incorporated herein by reference.

FIELD

The embodiments discussed herein are related to an electronic device and an optical connector that optically connect an optical waveguide with an optical element.

BACKGROUND

A technique has conventionally been used for optically connecting optical elements or an optical module having optical elements with optical waveguides in an optical package having a photoelectric conversion function, where the optical elements are arranged in an array around a Large Scale Integration (LSI) chip.

In order to optically connect optical waveguides and optical elements, a technique has been used for connecting in a lump a plurality of separate optical waveguides and a plurality of optical elements, respectively (see Patent Documents 1 through 3 for example).

Patent Document 1: Japanese Laid-open Patent Publication No. 2011-17933
Patent Document 2: Japanese Laid-open Patent Publication No. 2009-175275
Patent Document 3: Japanese Laid-open Patent Publication No. 2009-134262

SUMMARY

According to an aspect of the embodiments, an electronic device includes a board including an electronic component, a plurality of optical interface units that include an optical element which inputs or outputs light and that are provided on the board, and a plurality of individual positioning units that position a plurality of respective optical waveguides which are separate from each other at least at tip portions on a side of the optical interface units and which are optically aligned with the optical element with respect to the optical interface units independently from each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 explains height level relationships between an individual positioning pin and a tentative positioning pin according to an embodiment;
FIG. 8 is an enlarged view schematically illustrating a structure of portion B in FIG. 3 according to a first variation embodiment;
FIG. 13 is a front view schematically illustrating an electronic device according to a fourth variation embodiment.

DESCRIPTION OF EMBODIMENTS

It is difficult, for example, to perform alignment at one time for all optical elements that are arranged in array, with optical axes of a plurality of separate optical waveguides within a tolerance. For an optical connection between optical waveguides and optical elements, an accuracy higher than that of an electric connection is often required, and variations in pitches between a plurality of separate optical waveguides or a plurality of optical elements will result in positional shifts.

Also, while a method in which a plurality of separate optical waveguides each receive optical axis alignment with optical elements achieves a high accuracy, this method is not advantageous in workability and cost.

Hereinafter, explanations will be given for an electronic device and an optical connector according to an embodiment.

Figure 1:
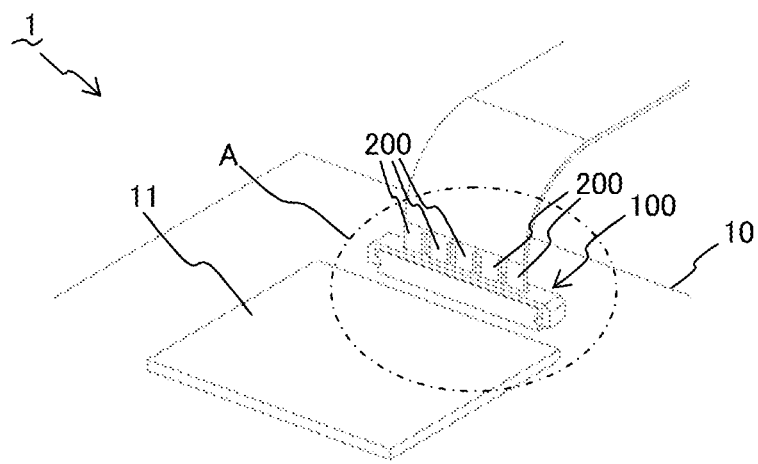
FIG. 1 is a perspective view illustrating an electronic device according to an embodiment.

FIG. 1 is a perspective view illustrating an electronic device according to an embodiment.

Figure 2:
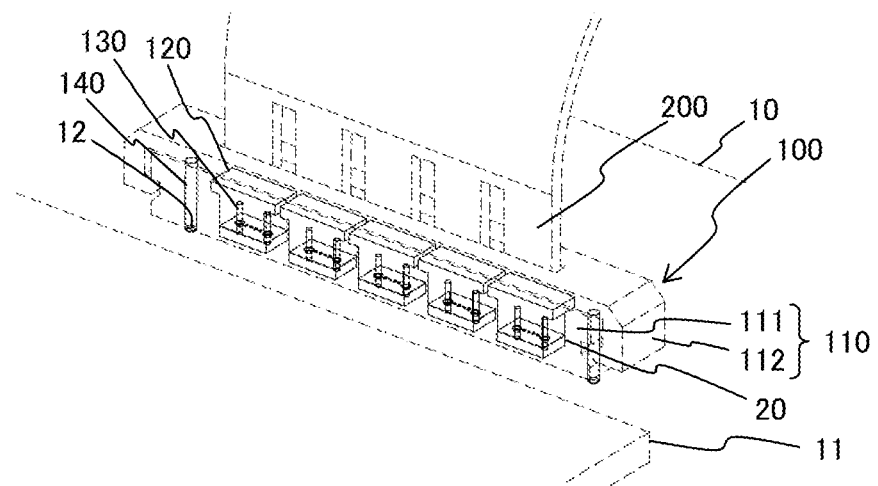
FIG. 2 is an enlarged view illustrating an internal structure of portion A illustrated in FIG. 1.
Figure 3:
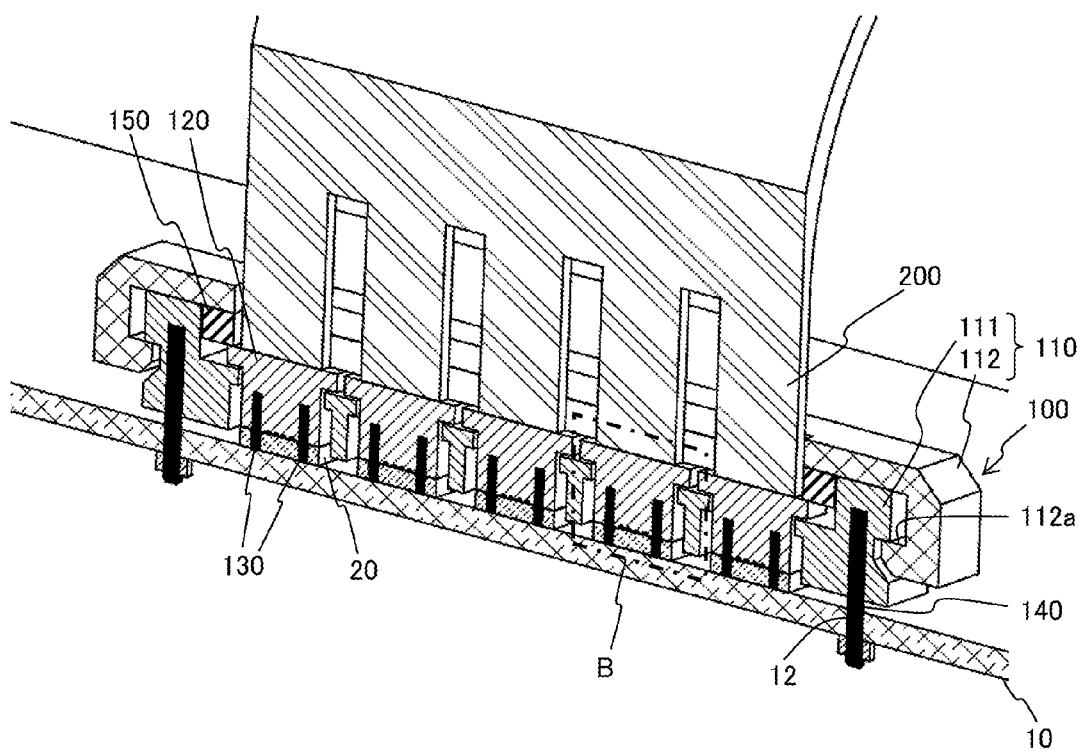
FIG. 3 is an enlarged sectional view illustrating an internal structure of portion A illustrated in FIG. 1.

FIG. 2 and FIG. 3 are an enlarged view and an enlarged sectional view illustrating an internal structure of portion A illustrated in FIG. 1.

Figure 4:
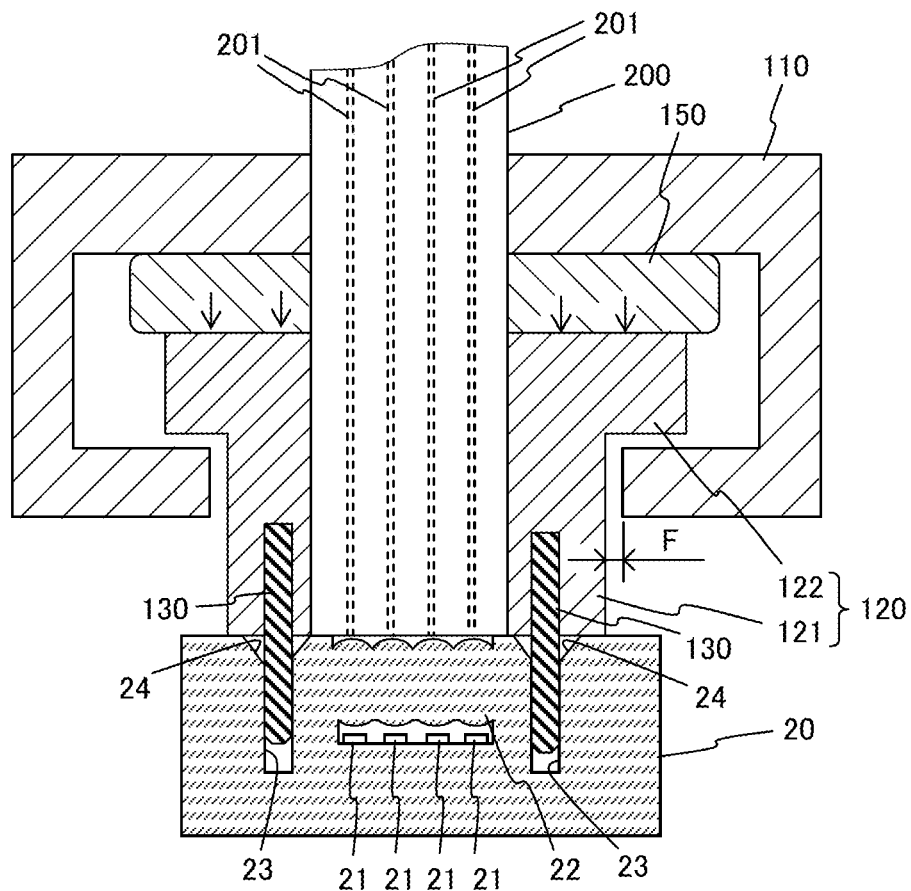
FIG. 4 is an enlarged view schematically illustrating a structure of portion B illustrated in FIG. 3.

FIG. 4 is an enlarged view schematically illustrating a structure of portion B illustrated in FIG. 3.

The electronic device 1 illustrated in FIG. 1 includes a board 10, a plurality of optical interface units 20 illustrated in FIG. 2 through FIG. 4, and an optical connector 100.

The board 10 illustrates an LSI chip 11 mounted as an example of an electronic component.

As illustrated in FIG. 2, two tentative positioning pin insertion holes 12 into which tentative positioning pins 140, which will be described later, are to be inserted are formed on the board 10, for example.

The plurality of optical interface units 20 are formed on the board 10. For example, five optical interface units 20 are arranged in a line in the vicinity of the LSI chip 11.

As illustrated in FIG. 4, the optical interface units 20 include optical elements 21 that input or output light. The optical elements 21 are semiconductor laser diodes (LDs), which are light emitting elements, photo diodes (PDs), which are light receiving elements, or the like.

In the present embodiment, the four optical elements 21 are arranged in a line and have a function of an optical element having four channels.

The optical interface unit 20 include a lens eye 22. This lens eye 22 is arranged on an optical path between the optical elements 21 and an optical waveguide 200, which will be described later.

On the optical interface unit 20, for example two individual positioning pin insertion holes 23 into which individual positioning pins 130, which will be described later, are to be inserted are formed on the optical interface unit 20. Around the openings of the individual positioning pin insertion holes 23, guide surfaces 24, which are, for example, a chamfered portion, are formed. These guide surfaces 24 may be provided to individual positioning means such as holding members 120 or the individual positioning pins 130 instead of the optical interface unit 20. This point will be explained later.

As illustrated in FIG. 2 and FIG. 3, the optical connector 100 includes a housing 110, the holding members 120, the individual positioning pins 130, the tentative positioning pins 140, and an elastic member 150.

Into the housing 110, tip portions of the plurality of separate optical waveguides 200 are inserted. The housing 110 includes the housing main body 111 and a plunger 112.

The plurality of optical waveguides 200 are in a form of a sheet both in its separated portion and integrated portion, and are separated into five portions at the tip portions on the side of the optical interface units 20 in the present embodiment. The optical waveguides 200 may be optical fibers or polymer waveguides. Also, the plurality of optical waveguides 200 may be separated in a larger portion (in the longitudinal directions).

The optical waveguides 200 include one or a plurality of cores 201. According to an embodiment, the optical waveguides 200 include as many (i.e., four) cores 201 as there are optical elements 21 in the optically connected optical interface units 20. The cores 201 receive optical axes alignment with the optical elements 21. The optical waveguides 200 transmit light, for example, between the electronic device 1 and a different electronic device; however, they may transmit light within the electronic device 1, as will be explained in FIG. 13 (the fourth variation embodiment).

The housing main body 111 is arranged at a lower portion of the plunger 112. Into the housing main body 111, the plurality of holding members 120, which will be described later, are inserted together with the optical waveguides 200. The holding members 120 and the optical waveguides 200 are inserted into the housing main body 111 after passing through the plunger 112.

The plunger 112 is engaged with the housing main body 111 by, for example, a pair of right and left claws 112a so as to be fixed. The plunger 112 is fixed with the housing main body 111 with, for example, the elastic member 150, which will be explained later, and the holding members 120 holding the optical waveguides 200 which are between the plunger 112 and the housing main body 111.

The housing main body 111 and the plunger 112 are made of, for example, resin, however, a metal material may be used for the plunger 112 to achieve rigidity.

The plurality of holding members 120 hold the tip portions of the separate optical waveguides 200. The holding members 120 are movably arranged in the housing 110. Thereby, it is possible to independently determine positions of the respective optical waveguides 200 held by the plurality of the holding members 120 with respect to the optical interface units 20.

As illustrated in FIG. 4, the holding member 120 includes a holding member main body 121 and a flange 122. The holding member main body 121 and the flange 122 are, for example, resin.

The holding member main body 121 is in, for example, a square cylindrical shape, and has the optical waveguides 200 pass through the center of itself.

The flange 122 is provided around the entirety of the top end of the holding member main body 121 (the end opposite to the optical interface unit 20), and projects outwardly from the holding member main body 121.

The holding members 120 are supported from below by the housing main body 111 (which is illustrated as the housing 110 without discrimination between the housing main body 111 and the plunger 112 in FIG. 4) at the bottom of the flange 122. However, when the optical waveguides 200 and the optical interface units 20 have been positioned, the holding member 120 moves in the direction to press on the elastic member 150 (upward), which will be described later, with respect to the housing 110, and thus the flange 122 does not touch the housing main body 111.

For example, two individual positioning pins 130 are provided in such a manner that they project to the side of the optical interface units 20 from the bottom of the holding member 120 (tip surface of the side of the optical interface units 20). The individual positioning pins 130 are inserted into the individual positioning pin insertion holes 23 of the optical interface units 20. It is desirable that the individual positioning pins 130 and individual positioning pin insertion holes 23 be provided at at least two positions having the optical waveguide 200 between them. The individual positioning pins 130 can be, for example, approximately 0.5 mm in diameter, and accordingly metals such as, for example, stainless steel or aluminum are desirable to be used for small diameters such as this.

The two individual positioning pins 130 and the two individual positioning pin insertion holes 23 function as an example of individual positioning means. Members (the two individual positioning pins 130) of the optical connector 100 are also treated as individual positioning means. The guide surfaces 24, which will be described later, also function as part of the positioning means.

Individual positioning means determine positions of the respective plurality of optical waveguides 200 with respect to the optical interface units 20 in an independent manner from each other. It is sufficient that individual positioning means are provided at least in either the holding members 120 or the optical interface units 20. It is also possible to employ a configuration in which the individual positioning pins 130 are provided to the optical interface units 20 so that the individual positioning pin insertion holes 23 are provided to the holding members 120.

It is desirable that two tentative positioning pins 140 be provided in such a manner that they project to the side of the board 10 from both ends of the housing main body 111 in the longitudinal direction, as illustrated in FIG. 2 and FIG. 3. The tentative positioning pins 140 are inserted into the tentative positioning pin insertion holes 12 of the board 10. It is desirable that the tentative positioning pins 140 and the tentative positioning pin insertion holes 12 be provided at at least two positions having the plurality of holding members 120 between them.

Material of the tentative positioning pins 140 is, for example, resin. The tentative positioning pins 140 may also be threaded so as to be screwed into the tentative positioning pin insertion holes 12 or nuts that are also threaded. Alternatively, the tentative positioning pins 140 may be fixed with respect to the tentative positioning pin insertion holes 12 by a snap-fit structure.

The two tentative positioning pins 140 and the two tentative positioning pin insertion holes 12 function as an example of tentative positioning means. Members (the two tentative positioning pins 140) of the optical connector 100 are also treated as tentative positioning means. Tentative positioning means determine the positions of the housing main body 111 (the housing 110) with respect to the board 10 so as to tentatively determine the positions of the plurality of optical waveguides 200 with respect to the optical interface units 20. It is desirable that tentative positioning means be provided to at least either the housing 110 or the board 10.

The guide surfaces 24 of the optical interface units 20 illustrated in FIG. 4 guide the optical waveguides 200 positioned by the two tentative positioning pins 140 and the two tentative positioning pin insertion holes 12, with respect to the optical interface units 20. Accordingly, it is desirable that the dimension of the guide surface 24 meet relationships that will be described later by referring to FIG. 5 and FIG. 6. Although the guide surfaces 24 are provided to the optical interface units 20 in the present embodiment, it is desirable to provide the guide surface 24 to the holding members 120, the optical interface units 20 or the individual positioning means or any combination thereof.

As illustrated in FIG. 3 and FIG. 4, the elastic member 150 is arranged between the plunger 112 (housing 110) and the plurality of holding members 120, and presses the plurality of holding members 120 toward the plurality of optical interface units 20.

The plurality of optical waveguides 200 pass through the elastic member 150. The elastic member 150 is, for example, rectangular and the plurality of optical waveguides 200 are inserted into the central rectangular opening; however, the elastic member 150 may have through holes for the respective optical waveguides 200. Alternatively, the elastic member 150 may be divided into a plurality of pieces (as many pieces as there are the holding members 120, for example).

The elastic member 150 is, for example, an elastic structure made of synthetic rubber, a spring, or a plate spring. Examples of synthetic rubber are nitrile butadiene rubber (NBR), ethylene propylene diene monomer (EPDM), and silicone. It is desirable that the elastic member 150 be of synthetic rubber in order to cause pressing forces evenly.

Figure 5:
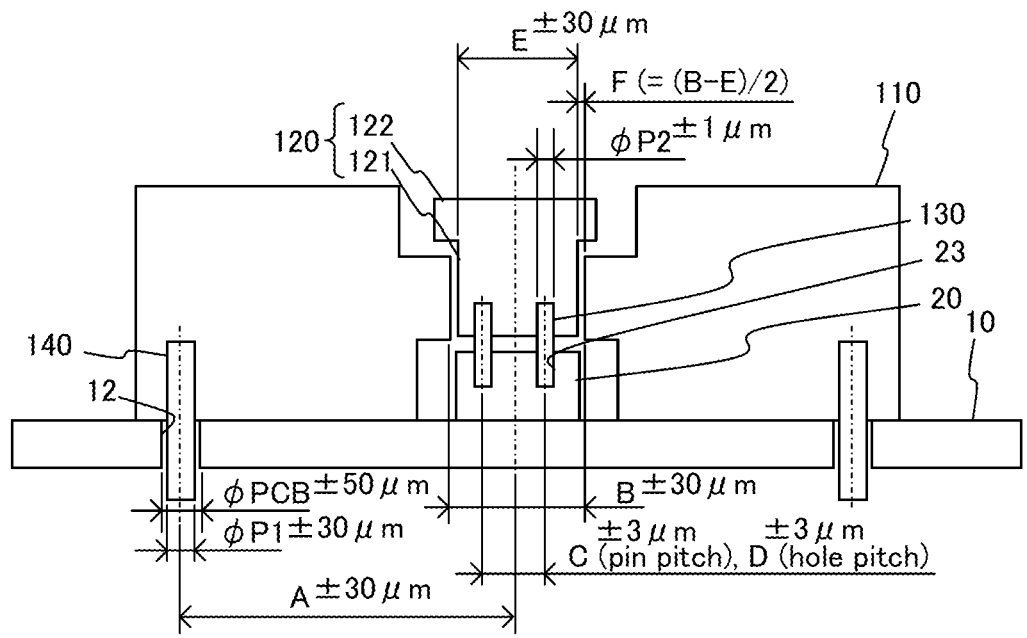
FIG. 5 explains an example of dimensional tolerance and a floating amount of each member according to an embodiment.

FIG. 5 explains an example of dimensional tolerance and a floating amount of each member according to the present embodiment.

Figure 6:
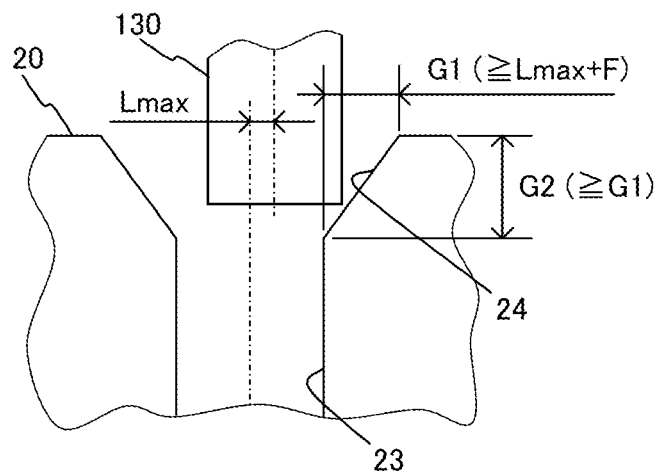
FIG. 6 explains dimensions of a guide surface according to an embodiment.

FIG. 6 explains dimensions of the guide surface 24 in accordance with the dimensional tolerance and floating amount illustrated in FIG. 5.

It is desirable that the dimensions of the guide surface 24 illustrated in FIG. 6 be determined with the tentative positioning pins 140 having been inserted into the tentative positioning pin insertion holes 12 while considering maximum shift amount Lmax of dimensional tolerance and floating amount F of each member. The dimensional tolerance explained here is dimensional tolerance in the longitudinal directions of the holding member 120 on the plane orthogonal to the insertion directions of the individual positioning pins 130 (right and left directions in FIG. 5 and FIG. 6).

Also, here, maximum shift amount Lmax is calculated in a case where the individual positioning pins 130 shift to right in FIG. 5 and FIG. 6 with respect to the individual positioning pin insertion holes 23.

In a case where the dimensional tolerance of ΦP1, which is the diameter of the tentative positioning pin 140, is ±30 μm, when ΦP1 is smaller by 30 μm, maximum shift amount Lmax is affected by the length of 15 μm, which corresponds to the radius of the tentative positioning pin 140.

In a case where the dimensional tolerance of ΦPCB, which is the diameter of the tentative positioning pin insertion hole 12, is ±50 μm, when ΦPCB is greater by 50 μm, maximum shift amount Lmax is affected by the length of 25 μm, which corresponds to the radius of the tentative positioning pin insertion hole 12.

In a case where the dimensional tolerance of inter-center distance A between the individual positioning pin 130 and the optical interface unit 20 is ±30 μm, when the inter-center distance A is greater by 30 μm, maximum shift amount Lmax is affected by the length of 30 μm.

In a case where the dimensional tolerance of distance B over which the holding member 120 passes through the housing 110 is ±30 μm, when distance B is greater by 30 μm, maximum shift amount Lmax is affected by the length of 15 μm, half of 30 μm, for the rightward direction.

In a case where the dimensional tolerance of inter-center distance C of the two individual positioning pins 130 is ±3 μm, when inter-center distance C is greater by 3 μm, maximum shift amount Lmax is affected by the length of 1.5 μm, half of 3 μm, for the rightward direction.

In a case where the dimensional tolerance of inter-center distance D of the two individual positioning pin insertion holes 23 is ±3 μm, when inter-center distance D is smaller by 3 μm, maximum shift amount Lmax is affected by the length of 1.5 μm, half of 3 μm, for the rightward direction.

In a case where the dimensional tolerance of ΦP2, which is the diameter of the individual positioning pin 130, is ±1 μm, when ΦP2 is greater by 1 μm, maximum shift amount Lmax is affected by the length of 0.5 μm, which corresponds to the radius of the tentative positioning pin 140.

In a case where the dimensional tolerance of width E of the holding member main body 121 is ±30 μm, when width E is smaller by 30 μm, maximum shift amount Lmax is affected by the length of 15 μm, half of 30 μm, for the rightward direction.

On the basis of the above, it is possible to obtain 103.5 μm as the maximum shift amount Lmax in the present embodiment.

Also, the individual positioning pins 130 can move toward the housing 110 similarly to the holding member 120. Accordingly, it is desirable that width G1 of the guide surface 24 be a value equal to or greater than a value obtained by adding floating amount F (0.1 mm for example) in the rightward direction in FIG. 5 and FIG. 6 to maximum shift amount Lmax (103.5 μm for example). Thereby, the individual positioning pins 130 are positioned in the areas of the individual positioning pin insertion holes 23 and the guide surface 24.

In order to guide the individual positioning pins 130 (and the optical waveguides 200) to the individual positioning pin insertion holes 23 (the optical interface units 20), it is also desirable for the guide surface 24 to be set at a height level G2 that is equal to or greater than the value of height level G1. Thereby, the angle of the guide surface 24 with respect to the vertical directions can be kept to be equal to or smaller than forty five degrees, making it possible to reliably guide the individual positioning pins 130 to the individual positioning pin insertion holes 23.

FIG. 7 explains height level relationships between the individual positioning pins 130 and the tentative positioning pins 140 according to the present embodiment.

Explanations will be given for relationships between the levels of the individual positioning pins 130 and the tentative positioning pins 140 (height in the downward direction in FIG. 7) when the plane at which the bottom of the flanges 122 of the holding members 120 and the housing main body 111 come into contact is assumed to be the reference plane.

In this example, a case is assumed where the lower end of the tentative positioning pins 140 and those of the tentative positioning pin insertion holes 12 are on the same plane and the lower end of the individual positioning pins 130 and the upper end of the optical interface units 20 (the individual positioning pin insertion holes 23 illustrated in FIG. 4) are on the same plane.

It is assumed that the height of the tentative positioning pin 140 (the projection length in the downward direction from the housing main body 111 in FIG. 7) is H1 and the height of the housing main body 111 from the reference plane is H2. It is also assumed that the height of the tip (lower end) of the individual positioning pin 130 from the reference plane is H3, the height of the optical interface unit 20 is H4, and the height corresponding to the thickness of the board 10 is H5.

In such a case, the relationship as expressed by equation (1) below is obtained for heights H1 through H5.

$$H1+H2=H3+H4+H5 \quad \text{Equation (1)}$$

However, at the moment when the individual positioning pins 130 are inserted into the individual positioning pin insertion holes 23, it is sufficient as long as the tentative positioning pins 140 are tentatively positioned by being at least partially inserted into the tentative positioning pin insertion holes 12. Therefore, a case is discussed where the lower end of the tentative positioning pin 140 is located at a position slightly lower than the upper end of the tentative positioning pin insertion hole 12 instead of a case where the lower end of the tentative positioning pin 140 is on the same plane as the lower end of the tentative positioning pin insertion hole 12.

In such a case, the relationship as expressed by equation (2) below is obtained for heights H1 through H4. Accordingly, it is possible to express height H1 by using heights H2 through H4 as in equation (3).

$$H1+H2>H3+H4 \quad \text{Equation (2)}$$

$$H1>H3+H4-H2 \quad \text{Equation (3)}$$

Accordingly, by determining the height of the tentative positioning pin 140 in accordance with equation (3) above, it is possible to perform individual positioning by the individual positioning pins 130 and the individual positioning pin insertion holes 23 after performing tentative positioning by the tentative positioning pins 140.

FIG. 8 is an enlarged view schematically illustrating a structure of portion B in FIG. 3 according to a first variation embodiment.

Individual positioning means according to the present variation embodiment are of a convex portion exemplified by a holding member main body 311 of a holding member 310, a concave portion 322, and a guide surface 323 of an optical interface unit 320.

The holding member 310 according to the present variation embodiment also has a holding member main body 311 and a flange 312 similarly to the holding member 120 illustrated in FIG. 4.

Similarly to the optical interface unit 20 illustrated in FIG. 4, the optical interface unit 320 includes optical elements 321 and a guide surface 324, and further includes a convex portion 322. The optical elements 321 are exposed to the concave portion 322.

The holding member main body 311 is fitted into the concave portion 322 at a portion of the tip on the side of the optical interface unit 320. Thereby, each of the plurality of optical waveguides 200 is positioned with respect to the optical interface units 320 independently from each other. Also, the optical waveguides 200 are inserted into the concave portion 322 and abut on or come close to the optical elements 321 exposed within the concave portion 322. It is also possible to employ a configuration in which a concave portion is provided to the holding member 310 and a convex portion is provided to the optical interface unit 320.

Figure 9:
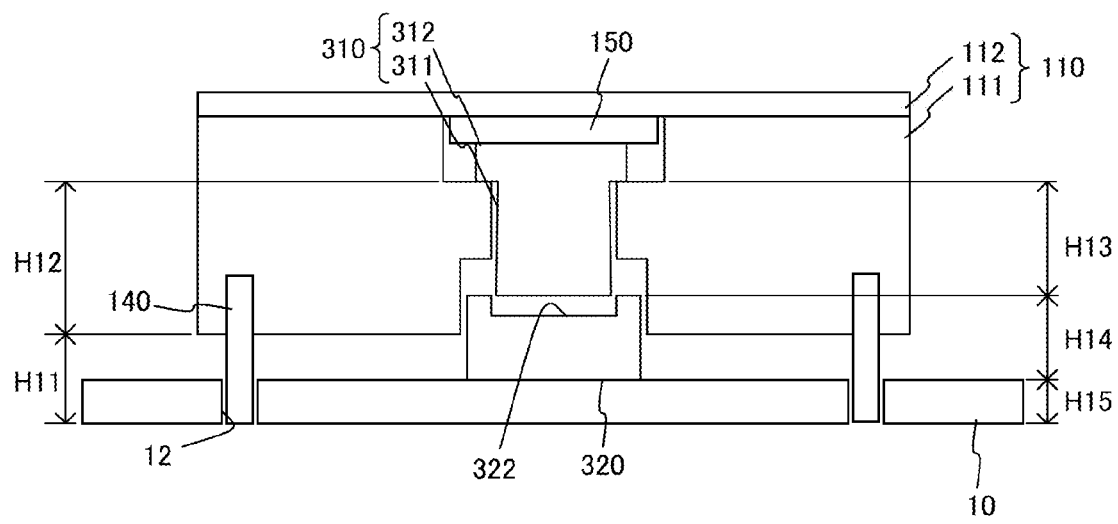
FIG. 9 explains height level relationships between a holding member main body and a tentative positioning pin according to the first variation embodiment.

FIG. 9 explains the height level relationships between the holding member main body 311 and the tentative positioning pin 140 according to the first variation embodiment.

The dimensions of the guide surface 323 can be calculated by using the dimensional tolerances of the holding member main body 311 and the concave portion 322 instead of the dimensional tolerances of inter-center distances C and D and ΦP2, and thus, explanations thereof will be omitted.

In the first variation embodiment, a case is discussed where the lower end of the tentative positioning pin 140 and the lower end of the tentative positioning pin insertion hole 12 are on the same plane and the lower end of the holding member main body 311 and the upper end of the optical interface unit 20 (the concave portion 322) are on the same plane.

It is assumed that the height of the tentative positioning pin 140 (the projection length in the downward direction from the housing main body 111 in FIG. 9) is H11 and the height of the housing main body 111 from the reference plane is H12. It is also assumed that the height of the tip (lower end) of the holding member main body 311 from the reference plane is H13, the height of the optical interface unit 320 is H14, and the height corresponding to the thickness of the board 10 is H15.

In such a case, the relationship as expressed by equation (4) below is obtained for heights H11 through H15.

$$H11+H12=H13+H14+H15 \quad \text{Equation (4)}$$

However, also in the first variation embodiment, at the moment when the holding member main bodies 311 are inserted into the concave portions 322, it is sufficient if the tentative positioning pins 140 are tentatively positioned by being at least partially inserted into the tentative positioning pin insertion holes 12. Therefore, a case is discussed where the lower end of the tentative positioning pin 140 is located at a position slightly lower than the upper end of the tentative positioning pin insertion hole 12 instead of a case where the lower end of the tentative positioning pin 140 is on the same plane as the lower end of the tentative positioning pin insertion hole 12.

In such a case, the relationship as expressed by equation (5) below is obtained for heights H11 through H14. Accordingly, height H11 can be expressed by using heights H12 through H14 as in equation (6).

$$H11+H12>H13+H14 \quad \text{Equation (5)}$$

$$H11>H13+H14-H12 \quad \text{Equation (6)}$$

Accordingly, by determining the height of the tentative positioning pin 140 in accordance with equation (6) above, it is possible to perform individual positioning by the holding member main bodies 311 and the concave portions 322 after performing tentative positioning by the tentative positioning pins 140.

Figure 10:
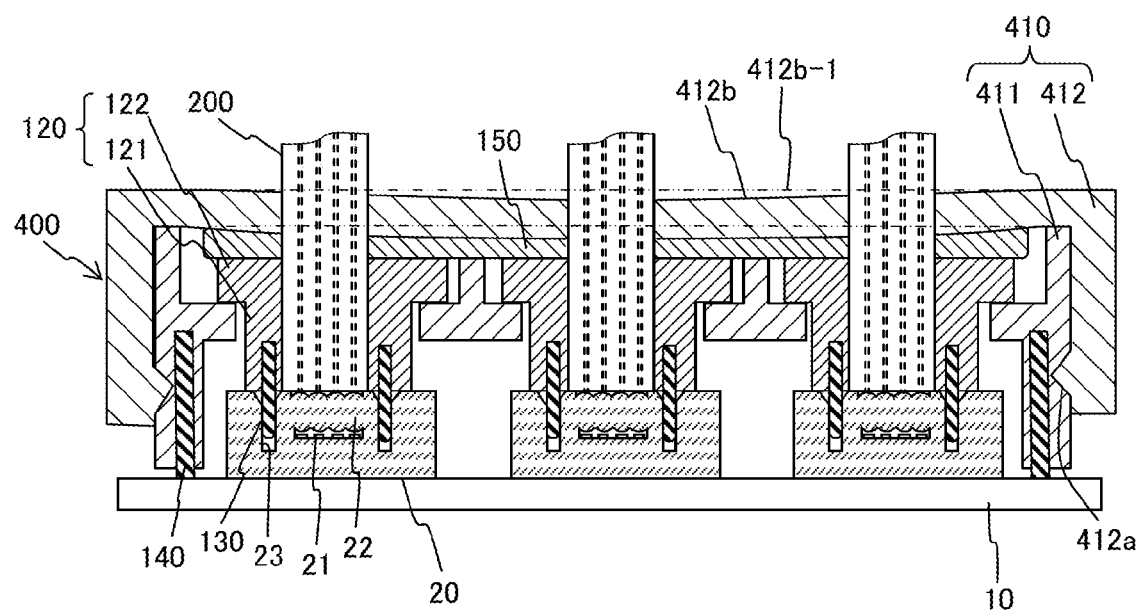
FIG. 10 is a sectional view schematically illustrating a structure of an optical connector according to a second variation embodiment.

FIG. 10 is a sectional view schematically illustrating a configuration of an optical connector 400 according to a second variation embodiment.

The optical connector 400 is identical to the optical connector 100 illustrated in FIG. 2 and FIG. 3 except that a housing 410 is different from the optical connector 100.

The housing 410 includes a housing main body 411 that is similar to the housing main body 111 illustrated in FIG. 2 and FIG. 3, and a plunger 412 that is different from the plunger 112 illustrated in FIG. 2 and FIG. 3.

The plunger 412 includes a claw 412*a* similar to the claw 112*a* illustrated in FIG. 3 and a curved portion 412*b*.

The curved portion 412b is a portion of the plunger 412 in a shape of a half arc that is curved to the side of the elastic member 150 more than a virtual straight portion 412b-1 represented by an imaginary line (double-dot-dashed lines) in the portion (or a plane only) that abuts on the upper surface of the elastic member 150.

In the curved portion 412b for example, the housing 410 projects more to the side of the elastic member 150 at the central portion than in the peripheral portion of the elastic member 150 with respect to the plane orthogonal to the thickness directions of the elastic member 150 (right and left directions in FIG. 10).

Figure 11:
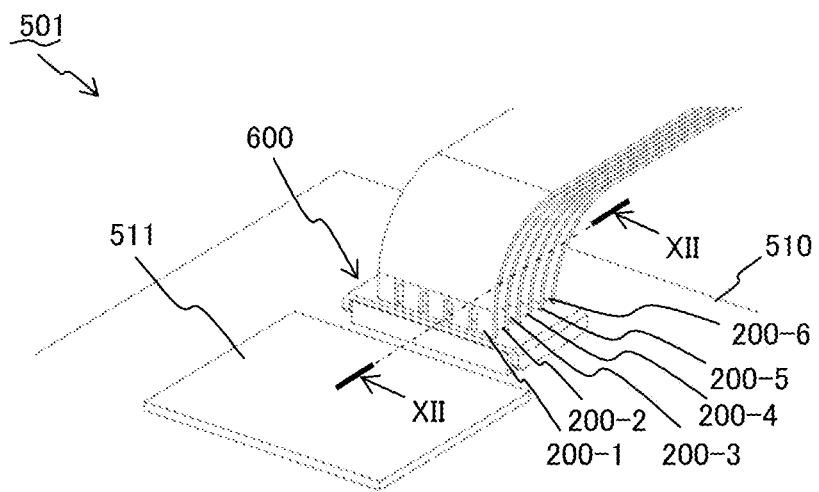
FIG. 11 is a perspective view illustrating an electronic device according to a third variation embodiment.

FIG. 11 is a perspective view illustrating an electronic device 501 according to a third variation embodiment.

Figure 12:
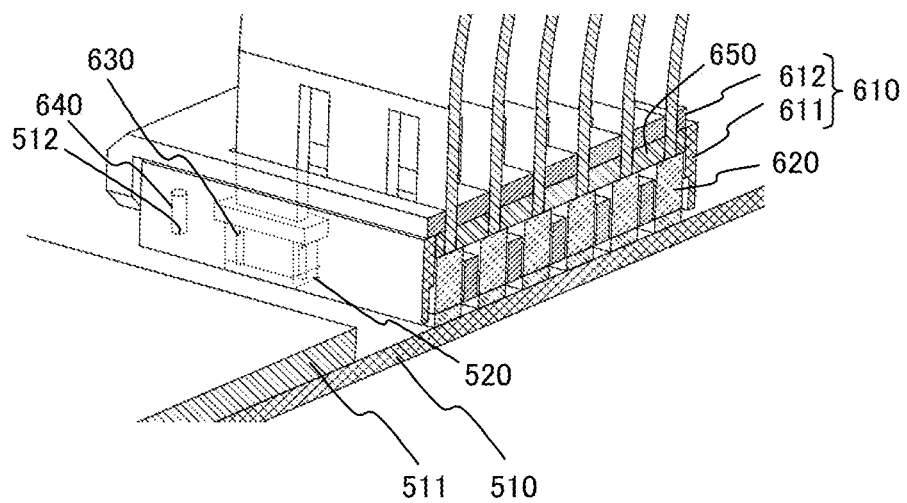
FIG. 12 is a sectional view along XII-XII in FIG. 11.

FIG. 12 is a sectional view along XII-XII of FIG. 11.

Similarly to the electronic device 1 illustrated in FIG. 1, the electronic device 501 includes a board 510 including an LSI chip 511 and tentative positioning pin insertion holes 512, and optical interface units 520. However, in the third variation embodiment, the optical interface units 520 are arranged in a plurality of lines (six lines in the present variation embodiment) that are parallel to each other. Thus, the optical interface units 520 are arranged in a plurality of lines by a plurality of rows.

The six optical waveguides 200 (200-1 through 200-6) that are parallel to each other are positioned in optical interface units 520 that are separate from each other.

Similarly to the optical connector 100 illustrated in FIG. 2 and FIG. 3, an optical connector 600 includes a housing 610 including a housing main body 611 and a plunger 612, holding members 620, individual positioning pins 630, tentative positioning pins 640, and an elastic member 650.

The housing 610 and the elastic member 650 may be of a single member in the optical connector 600.

It is also possible to adopt a configuration in which for example the two tentative positioning pins 640 position the single housing 610 with respect to the board 510 instead of arranging the tentative positioning pins 640 for each of the optical interface units 520 in line.

FIG. 13 schematically illustrates an electronic device 701 according to a fourth variation embodiment.

The electronic device 701 includes a plurality of first optical interface units 720-1 and a plurality of second optical interface units 720-2 that are provided at two spots around LSI chips 711 in boards 710 that are identical to each other.

The optical waveguides 200 optically connect the plurality of first optical interface units 720-1 and the plurality of second optical interface units 720-2.

A plurality of individual positioning means (optical connectors 100) according to the present variation embodiment are arranged on the side of the plurality of first optical interface units 720-1 and the side of the plurality of second optical interface units 720-2, respectively.

In the present embodiment described above, the individual positioning pin insertion holes 23 and the individual positioning pins 130 that are examples of a plurality of individual positioning means position each of the plurality of optical waveguides 200 that are separate from each other with respect to the optical interface units 20 that are independent from each other.

Accordingly, it is possible to independently position each of the plurality of optical waveguides 200 that are separate from each other, leading to highly accurate positioning. It is also possible to perform simultaneous positioning by using a plurality of individual positioning means, making positioning easy. Further, highly accurate positioning is possible even when image recognition by the use of an electronic microscope or the like is not performed.

Therefore, according to the present embodiment, it is possible to perform optical axis alignment of the plurality of separate optical waveguides 200 with the optical elements 21 easily and highly accurately.

Also, according to the present embodiment, the tentative positioning pin insertion holes 12 and the tentative positioning pins 140 that are examples of tentative positioning means position the housing 110 with respect to the board 10, and thereby the plurality of optical waveguides 200 are positioned with respect to the plurality of optical interface units 20. Accordingly, it is possible to perform optical alignment more accurately by performing individuation positioning after positioning the plurality of optical waveguides 200 with respect to the plurality of optical interface units 20.

Also, according to the present embodiment, the guide surfaces 24 included in the individual positioning means guide to the optical interface units 20 the optical waveguides 200 that have been positioned tentatively by the tentative positioning means (the tentative positioning pin insertion holes 12 and the tentative positioning pins 140). This realizes optical alignment with a higher accuracy.

Also, according to the present embodiment, the elastic member 150 is arranged between the housing 110 and the plurality of holding members 120 so as to press the plurality of holding members 120 toward the plurality of optical interface units 20. This makes it possible to bring the holding members 120 (the optical waveguides 200) and the optical interface units 20 into close contact to each other and to define the position (height) of the holding members 120 and the optical waveguides 200 to one fixed value. This enables optical alignment with a higher accuracy.

Also, according to the present embodiment, the individual positioning pins 130 are provided to the holding members 120 (an example of one of the holding member 120 and the optical interface unit 20), and the individual positioning pin insertion holes 23 are provided to the optical interface unit 20 (an example of the other). This enables optical alignment in a simple configuration including the individual positioning pins 130 and the individual positioning pin insertion holes 23.

Also, according to the present embodiment, the individual positioning pins 130 and the individual positioning pin insertion holes 23 are arranged at at least two positions having the optical waveguides 200 between them. This enables optical alignment in a simpler configuration.

Also, according to the present embodiment, the tentative positioning pins 140 are provided to the housing 110 (an example of one of the housing 110 and the board 10), and the tentative positioning pin insertion holes 12 are provided to the board 10 (an example of the other). This makes it possible to perform tentative positioning in a simple configuration including the tentative positioning pins 140 and the tentative positioning pin insertion holes 12.

Also, in the first variation embodiment (FIG. 8 and FIG. 9), examples of the individual positioning means are a convex portion (the holding member main body 311) and the concave portion 322. The convex portion is provided to the holding member 310 (an example of one of the holding member 310 and the optical interface unit 320), and the concave portion 322 is provided to the optical interface unit 320 (an example of the other) so as to be fitted with the convex portion. This can reduce the number of components compared with a case where the individual positioning pins 130 and the individual positioning pin insertion holes 23 are used.

Also, in the first variation embodiment (FIG. 8 and FIG. 9), the convex portion (holding member main body 311) is provided to the holding member 310, and the concave portion 322 is provided to the optical interface unit 320. Also, the optical waveguides 200 pass through the convex portion of the holding member 310 (the holding member main body 311) and are inserted into the concave portion 322. By inserting the convex portion into the concave portion together with the optical waveguides 200, it is possible to perform optical alignment with a higher accuracy.

Also, according to the second variation embodiment (FIG. 10), the housing 410 projects more to the side of the elastic member 150 at the central portion than in the peripheral portion of the elastic member 150 with respect to the plane orthogonal to the thickness directions of the elastic member 150. This makes it possible to suppress the reduction in the evenness of the pressing force toward the holding member 120 that is caused by the housing 410 being upwardly deformed by the reactive force by the elastic member 150. Accordingly, it is possible to perform optical alignment with higher accuracy.

Also, in the second variation embodiment (FIG. 10), the housing 410 includes a curved portion 412b that is curved in such a manner that the housing 410 projects to the side of the elastic member 150 more at the central portion than in the peripheral portion of the elastic member 150. This makes it possible to suppress the reduction in the evenness of the pressing force toward the holding member 120 more reliably.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
a board including an electronic component;
a plurality of optical interface units that are provided on the board, each of the plurality of optical interface units including an optical element which inputs or outputs light;
a plurality of individual positioning units that position a plurality of respective optical waveguides which are separate from each other at least at tip portions on a side of the optical interface units and which are optically aligned with the optical element with respect to the optical interface units independently from each other;
a housing into which the tip portions of the plurality of optical waveguides are inserted;
a plurality of holding members that hold the tip portions of the plurality of optical waveguides and that are arranged movably with respect to the housing; and
a tentative positioning unit that tentatively positions the plurality of optical waveguides with respect to the plurality of optical interface units by positioning the housing with respect to the board, wherein:
the individual positioning units are provided to the holding member or the optical interface unit or any combination thereof.

2. The electronic device according to claim 1, wherein:
the individual positioning unit includes a guide surface that guides, to the optical interface units, the optical waveguides tentatively positioned by the tentative positioning unit; and
the guide surface is provided to the holding member, the optical interface unit or the individual positioning unit or any combination thereof.

3. The electronic device according to claim 1, further comprising:
an elastic member that is provided between the housing and the plurality of holding members and that presses the plurality of holding members toward the plurality of optical interface units.

4. The electronic device according to claim 3, wherein:
the housing projects to a side of the elastic member more at a central portion than in a peripheral portion of the elastic member with respect to a plane orthogonal to thickness directions of the elastic member.

5. The electronic device according to claim 4, wherein:
the housing includes a curved portion that is curved in such a manner that the housing projects to a side of the elastic member more at the central portion than in the peripheral portion of the elastic member.

6. The electronic device according to claim 1, wherein:
the individual positioning unit includes an individual positioning pin provided to one of the holding member and the optical interface unit, and an individual positioning pin insertion hole which is provided to the other one of the holding member and the optical interface unit and into which the pin is inserted.

7. The electronic device according to claim 6, wherein:
the individual positioning pin and the individual positioning pin insertion hole are provided to at least two positions including the optical waveguides therebetween.

8. The electronic device according to claim 1, wherein:
the individual positioning unit includes a convex portion provided to one of the holding member and the optical interface unit, and a concave portion that is provided to the other one of the holding member and the optical interface unit and that is fitted with the convex portion.

9. The electronic device according to claim 8, wherein:
the convex portion is provided to the holding member;
the concave portion is provided to the optical interface unit; and
the optical waveguides pass through the convex portion of the holding member and are inserted into the concave portion.

10. The electronic device according to claim 1, wherein:
the tentative positioning unit includes a tentative positioning pin provided to one of the housing and the board, and an individual positioning pin insertion hole provided to the other one of the housing and the board.

11. The electronic device according to claim 1, wherein:
each of the plurality of optical interface units includes the plurality of optical elements; and each of the plurality of optical waveguides includes a plurality of cores that are optically aligned with the optical elements.

12. An electronic device comprising:
a board including an electronic component;
a plurality of optical interface units that are provided on the board, each of the plurality of optical interface units including an optical element which inputs or outputs light; and
a plurality of individual positioning units that position a plurality of respective optical waveguides which are separate from each other at least at tip portions on a side of the optical interface units and which are optically aligned with the optical element with respect to the optical interface units independently from each other, wherein:

the plurality of optical interface units include a plurality of first optical interface units and a plurality of second optical interface units that are provided on the same board;

the plurality of optical waveguides optically connect the plurality of first optical interface units and the plurality of second optical interface units; and the plurality of individual positioning units are provided to both a side of the plurality of first optical interface units and a side of the plurality of second optical interface units.

* * * * *